UNITED STATES PATENT OFFICE.

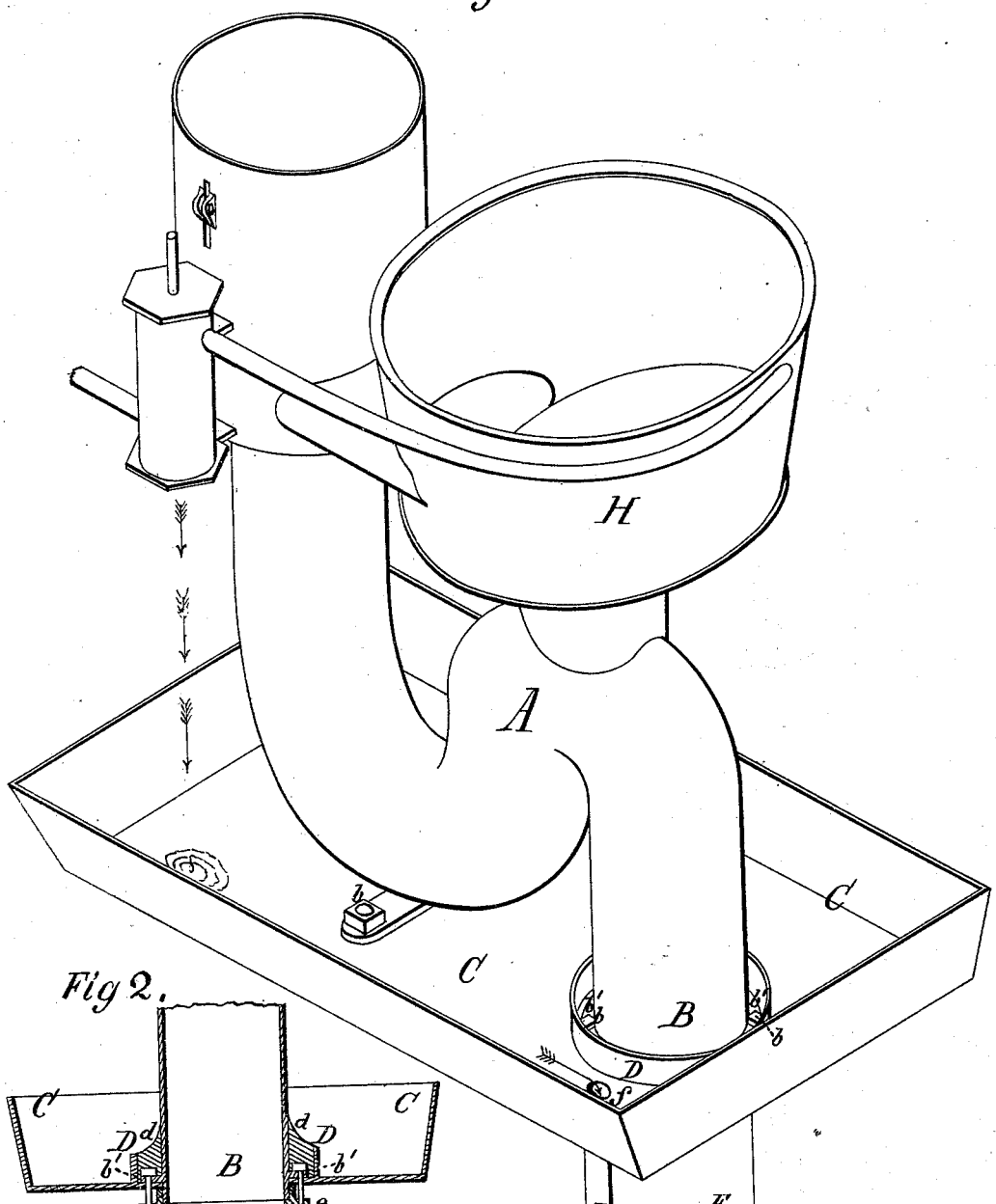

JOHN H. KEYSER, OF NEW YORK, N. Y.

IMPROVEMENT IN SAFETY-PANS FOR WATER-CLOSETS.

Specification forming part of Letters Patent No. 175,835, dated April 11, 1876; application filed February 28, 1876.

*To all whom it may concern:*

Be it known that I, JOHN H. KEYSER, of the city, county, and State of New York, have invented a new and useful Improvement in Water-Closets; which improvement is fully set forth in the following specification, reference being had to the drawings, in which—

Figure 1 is a perspective view of one of my improved water-closets, and Fig. 2 is a detailed sectional view, showing the connection of the soil or sewer pipe with my water-closet.

The nature of my invention consists in a water-tight pan, forming the basis of a water-closet, by which pan the leakage-water from all parts of the closet and the overflow-water from the casual filling of the hopper is collected, and, by an eduction pipe, delivered into the soil-pipe of the closet. It consists, further, in a new and improved water-tight connection between the said drip-pan, the trap, and the soil-pipe.

The object of my invention is to keep the flooring of water-closet apartments clean and dry, and render immediate repairs for trifling leakages unnecessary, thereby making the water-closet much cheaper in wear and tear, and preventing many petty annoyances in the dwelling in which the water-closet is located.

In the drawings, A represent a trap with hopper and valves attached. The foot B of the trap and other parts applied to it, as shown, are supported at the bottom by a metal pan, C, and secured thereto by bolts $b$, or other suitable means for that purpose. The pan C is provided with a rim, D, inside of which a hole is left for the lower part of the trap to pass through. The foot B of the trap is provided with a flange, $b'$, which rests on the bottom of the pan inside of the rim D, and is fastened with bolts $b$ to the said bottom and a flange, $e$, on a soil-pipe, E, thus making a solid and perfect fit between both pipes and pan C. The space inside of the rim D around the foot B of the trap is filled with cement, as seen at $d$, in Fig. 2, whereby leakage at that part of the pan is avoided. The pan C is of sufficiently large area to collect all drippings of the closet and its valves, including casual overflow-water from the hopper H. The drippings into the pan C are drawn off from the pan through a hole, $f$, and conducted through a waste or eduction pipe, F, (which, by preference, is provided with a gas-trap, $f'$,) into the soil-pipe E.

As it is a well-known fact that water-closets of common construction cannot be kept absolutely clean and dry through the different seasons of the year, and that when such water-closets are within a dwelling-house, the lack of cleanliness incident to their use is the cause of the fatal diseases, the usefulness of the above described pan C becomes evident.

Having thus described my invention, what I claim as new, and desire to secure by Letters Patent, is—

1. A drip-pan applied beneath a water-closet with its gas-trap and valves, which pan receives all drippings, overflow, and leakages of the closet, and conducts them away by means of an eduction-pipe into the soil-pipe, substantially as described.

2. In combination with a water-closet, a drip-pan, C, constructed with a packing-rim, D, substantially as and for the purpose described.

Witness my hand in the matter of my application for patent for an improved safety-pan for water-closets, this 21st day of February, 1876.

JOHN H. KEYSER.

Witnesses:
 FRED. A. PALMER,
 WM. B. MOORE.